350-96.1 SR

E197A XR 3,676,689 [redacted]

United States

Knepper, Sr.

3,676,689

[45] July 11, 1972

[54] OPTICAL CODE GENERATING APPARATUS

[72] Inventor: Delbert M. Knepper, Sr., Durham, N.C.

[73] Assignee: International Business Machines Corporation, Armonk, N.Y.

[22] Filed: Dec. 30, 1970

[21] Appl. No.: 102,727

[52] U.S. Cl. ....................250/219

[51] Int. Cl. ....................G01n 21/30

[58] Field of Search ..........250/219 D; 197/98; 178/17, 178/79; 340/380

[56] References Cited

UNITED STATES PATENTS

| | | | |
|---|---|---|---|
| 3,507,378 | 4/1970 | Stuckert | 197/98 |
| 3,495,239 | 2/1970 | Glorioso et al. | 340/365 |
| 3,465,099 | 9/1969 | Harris | 178/17 |
| 3,253,087 | 5/1966 | McIntosh | 178/79 |
| 3,144,643 | 8/1964 | Anderson | 340/380 |
| 3,469,103 | 9/1969 | Erpel | 250/219 D |
| 3,457,424 | 7/1969 | Jordan et al. | 250/219 D |
| 3,549,895 | 12/1970 | Sidorsky | 250/219 D |
| 3,042,806 | 7/1962 | Lubin | 250/219 D |
| 3,443,109 | 5/1969 | Broom et al. | 250/219 D |

*Primary Examiner*—William L. Sikes
*Attorney*—Hanifin & Jancin and Maurice H. Klitzman

[57] ABSTRACT

An optical encoding apparatus in which selected ones of a number of light conducting members are illuminated by a movable, independently selectable member, is disclosed. This movable member carries a coded array of illuminating areas. Photosensitive devices are associated with each of the light conductive members to indicate the illuminated condition of a given member, or array of members, in response to their being illuminated by the illuminating areas of the movable member. These photosensitive devices provide a coded output signal in the form of voltage or current information for use by other equipment which may utilize or be responsive to, or transmit the coded signals so produced.

10 Claims, 6 Drawing Figures

INVENTOR
DELBERT M. KNEPPER, SR.

BY Maurice H. Klitzman
ATTORNEY

OPTICAL CODE GENERATING APPARATUS

BACKGROUND OF THE INVENTION

1. Field of the Invention

This invention relates to an apparatus for generating n-bit coded information in response to optical excitation of electric signal generating means. More specifically, the invention relates to an apparatus for producing coded signals which are selected or composed at will, according to a prearranged code, or to a transmitter or encoder being actuated or controlled by a previously designed pattern, wherein a specific structure is associated with each key or other transmitting element, whereby each transmits a different signal, thereby enabling a code or a message to be transmitted by the successive action of the transmitting elements at the will of the operator.

2. Prior Art

Previously, it has been known to construct an optical encoding apparatus in which one or more apertured shutters are interposed between a source of light and one or more photosensitive devices. Herein, this type of apparatus will be referred to as a shutter-type apparatus. It has further been known that it is advantageous to utilize the light conductive properties of certain materials to carry the beams of light selected or generated by a shutter apparatus directly to the photosensitive elements, thereby eliminating certain problems in the alignment of the various elements.

One form of a prior art device utilizes an apertured card in which the apertures form a coded array of holes arranged in columns. This card is interposed between a source of light and a stack of light conducting members which have photocells attached thereto. Light emitted by the source passes through the holes in the apertured card and into various layers of the stack of light conductive elements. Different codes are selected either by using different lamps or sources of light opposite the various columns of coded apertures, or by moving the coded apertures in front of a single source of light. Still another form of this prior device utilizes a number of interleaved, apertured members which, like an apertured card, act as shutter elements to break up the beams of light from a light source to form a coded array of light beams impinging on the stack of light conductive elements. However, these prior art devices have suffered from a variety of shortcomings.

The type of structure which utilizes separate lamps to illuminate individual columns of holes in a coded shutter member requires individual electrical contacts for each lamp; these electrical contacts are subject to mechanical wear, pitting, and to mechanical malfunctions which cause failures in the proper switching on of a chosen lamp which results in an erroneous code being generated. Furthermore, the use of individual lamps entails constant surveillance to insure that all lamps are working properly at all times, since if a given lamp fails, it may not be detected at once, thereby allowing errors to be propagated until the failure is detected.

If only a single lamp is used in the known shutter-type encoder, it is necessary to move the shutters in front of the lamp to change the coded pattern. In this type of encoder, which utilizes a single apertured shutter having apertures arranged in coded columns, it is necessary to move the shutter in relation to the lamp, in accurate mechanical increments to insure proper alignment of the shutter openings and the lamp with respect to the light conductive element behind the shutter. The construction of mechanical positioning devices to provide the necessary shutter movement is often complicated and subject to many mechanical problems of wear, misalignment, maintenance, lubrication, vibration, and breakage, any of which may cause erroneous coding. Furthermore, accurate mechanical positioning requires tight tolerances and careful construction which makes the device expensive to build and maintain. Additionally, the use of a single coded aperture shutter creates delay in generating two successive codes if the apertures to generate those codes are located at relatively great distances from one another on the coded shutter element.

The type of encoder which utilizes interleaved apertured members, which may be individually selected to generate a desired code, eliminates this latter disadvantage, but does so at the cost of creating a much more mechanically complicated structure and also results in placing the source or sources of light at a greater distance from the point of entry of the light into the conductive elements, thereby reducing the amount of light available to the photosensitive devices and increasing the possibility of erroneous signal generation.

The use of interleaved shutter members creates a structure which is vulnerable to the intrusion of foreign objects which may become lodged between the shutters, thereby creating erroneous generation of coded light beams. In addition, some synchronization between the reading of the output from the photosensors and the actuation of a given shutter must be achieved in order to prevention the erroneous readings which may occur if the output of the photosensors is sampled while the apertured shutter is still in transtion from one point to another. This is generally accomplished by the use of electrical switches in connection with each selected shutter member to signal the photosensitive apparatus that a shutter is in position and it is time to sample the outputs. The use of such switches entails a continual problem in maintenance, in accurate positioning of the switches, and in erroneous readings due to contact bounce of the synchronizing switch.

The use of multiple, interleaved shutter elements, due to the complexity of the structure and the relatively large mechanical movement required, places fixed limitations upon the speed with which a given code may be selected or repeated. An attempt to generate higher speeds of operation in such a mechanical device compounds the problems with maintenance, alignment, and mechanical malfunction and the consequent possibility of erroneous code generation. In addition, the use of numerous interleaved apertured shutter members increases overall size of the structure and the increase in the mechanical complexity decreases the overall reliability of the system in view of the probability of malfunction of any given part.

OBJECTS OF THE INVENTION

In view of these and other deficiencies in the prior devices, it is an object of this invention to provide an improved optical code generating apparatus of simple, rugged construction and high mechanical reliability.

It is also an object of this invention to provide an easily alignable optical structure which is insensitive to the intrusion of foreign objects, thereby producing a more reliable system than is produced by the use of light beam interrupting shutters or aperture members.

Another object of this invention is to improve the synchronization of the sampling of the outputs on the photosensors with the operation of the code selecting apparatus by eliminating the use of mechanical switches generally used for this function in the prior art.

Still a further object of this invention is to reduce the amount of maintenance and attention required by the prior art use to numerous lamps, which are subject to burning out and breakage and require continual attention and maintenance, by reducing the number of lamps required.

It is still a further object of this invention to provide an improved optical code generating apparatus in which a given code element may be quickly and easily changed without affecting the operation of other code elements.

SUMMARY

This invention accomplishes the foregoing objects and overcomes problems inherent in the prior art by utilizing a number of separate independently selectable, movable illuminating members. Each illuminating member carriers a coded array of illuminating areas to illuminate selected ones of an array of light conducting members at a first location thereon. Each of such separate, movable illuminating members will hereinafter be referred to as an illuminating member or a light input member, it being understood that each illuminating or input member may be connected to an independent key or lever for actuation between an active and an inactive position. Each of the light conducting members has an electric signal generating means in connection with it to signal the presence of light. A compact and reliable structure is achieved by positioning the individual illuminating members within or beside the array of light conducting members, at a first location, thereby bringing the sources of light closer to the photosensitive elements in connection with the light conductive members. In one embodiment of this invention, only a single, separate primary source of illumination is provided for continuously providing a source of light for each of the separate illuminating areas on each illuminating member.

DETAILED DESCRIPTION

Figures 1, 2, 3, 4, 5, 6:
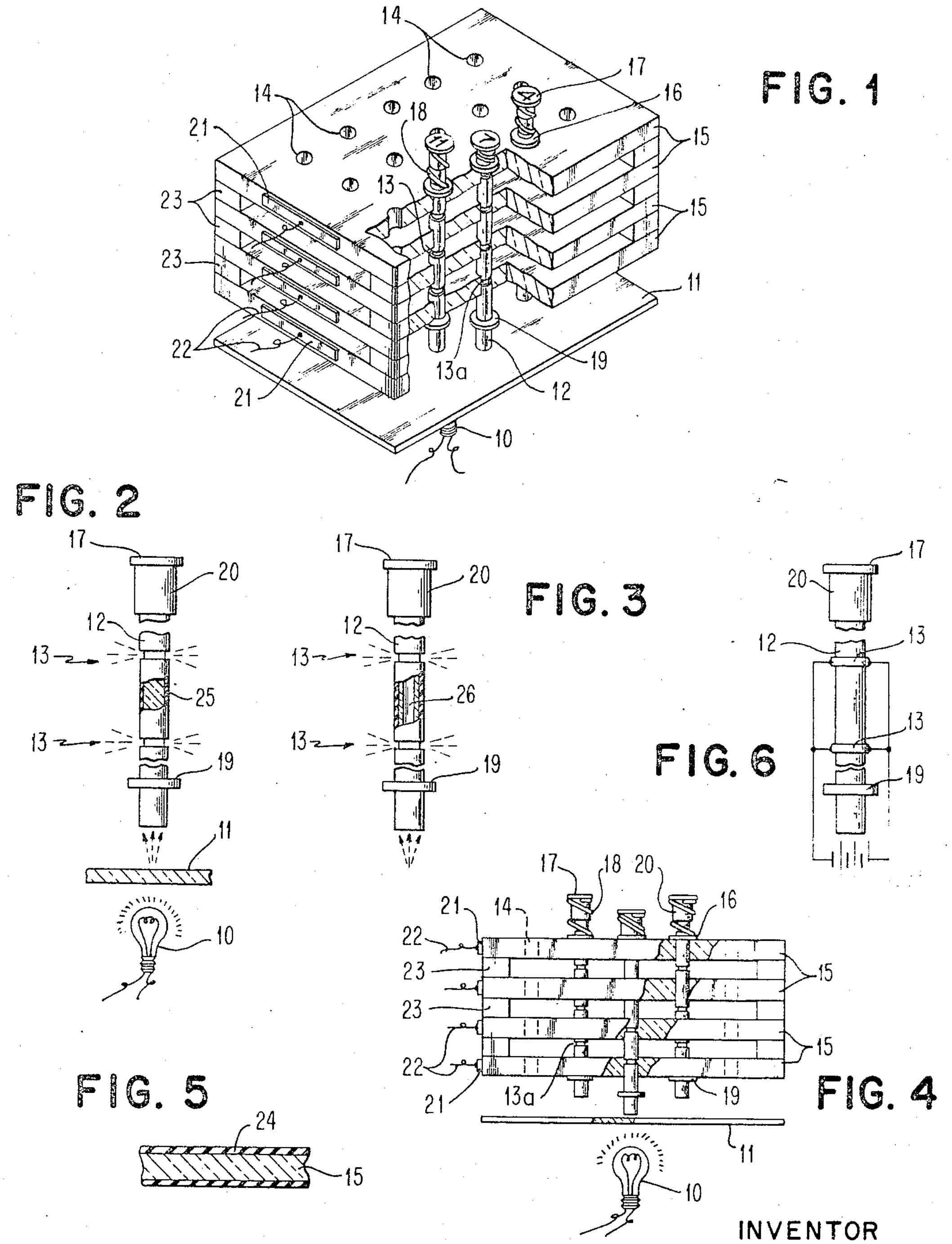
FIG. 1 is an overall view of an embodiment of the invention indicating its principle elements and the manner in which the movable illuminating members reciprocate from an inactive to an active position to direct light into the light conducting members.
FIG. 2 is a more detailed view of one of the movable input or illuminating members and shows how the light enters one end of the movable member and is emitted at various non-opaque areas along the stem thereof.
FIG. 3 is a drawing of a modification of a movable illuminating member in which a central longitudinal bore is provided in the stem.
FIG. 4 is a full side view of the embodiment shown in FIG. 1, further illustrating how the movable illuminating members operate to illuminate selected ones of the light conductive members which transmit the light to the photosensitive elements.
FIG. 5 is a partial side view of one of the light conducting members showing the opaque barrier layers thereon.
FIG. 6 shows another embodiment of a movable illuminating member in which the light emitting areas are electroluminescent bands or strips.

In its simplest form, only a single moving part is required to generate an $n$-bit code where $n$ is the number of bits required in a given code format. The code format desired is chosen to be compatible with the devices, such as digital computers, which will ultimately utilize the coded signals produced. In this form, the apparatus consists of a movable light conductive illuminating member which intersects a stack or array of $n+1$ individual light conductive members, at a first location thereon, each of which has a photosensitive device attached to it at a second location to indicate when light is flowing in a particular conductive member. The movable illuminating member is continuously illuminated at one end by a primary source of light and is disposed to reciprocate between two positions. Each such independently movable illuminating member acts as a source of even illumination along its entire length due, it is believed, to internal dispersion of light from the primary source. Thus, each such member would continuously illuminate each of the independent light conductive members which it intersects, were it not for the fact that selected areas of each independent movable illuminating member are made opaque. The selective opaquing produces a unitary coded illuminating shaft which will illuminate only those light conductive members which are adjacent non-opaque, or light emitting areas of the illuminating member. The independent movable illuminating member is urged into one of two extreme positions by suitable spring bias or other means. Light is continuously emitted from the active areas of the illuminating member, but the light conductive members are spaced apart so that when the movable illuminating member is in its rest or inactive, unactuated position, the light does not enter the light conductive members.

Referring now to the drawings, there is shown by way of example, an embodiment in FIG. 1 of an optical code generating apparatus which comprises a primary source of light 10. This source of light may be an electroluminent device, such as an incandescent or fluorescent lamp or lamps or an electroluminescent panel. For the purposes of this specification and claims, the term "electroluminent" is defined to comprehend all devices which emit light in response to the application of electric current thereto. In the present embodiment, the source is continuously illuminated. The light from the primary source 10 impinges on and passes through diffuser 11 which spreads the illumination from the source evenly over its surface. It is to be understood that primary source and diffuser 11 might be replaced with an electroluminescent panel or other electroluminent devices such as diodes which emit light. Likewise, if desired, the illuminating areas in a coded array on a movable illuminating member could be similarly replaced with electroluminent devices such as electroluminescent strips, miniature lamps, or with light emitting diodes or other well-known light producing devices. However, in the present embodiment, light from the diffuser 11 impinges upon the ends of movable illuminating members 12 and is transmitted throughout the length thereof. In the embodiment shown, the light diffuses throughout the length of movable illuminating members 12 and is permitted to exit at non-opaque areas 13 variously disposed along the length thereof. As shown, each movable illuminating member 12 is disposed to pass through a series of aligned apertures 14 in light conducting members 15 at what is termed a first location. A bearing and guide member 16 is shown positioned about the stem of member 12 where it passes through the topmost light conducting member 15. Similar guides could be placed on each surface intersected by the stem of said movable illuminating member. Each movable illuminating member 12 has a head 17 on which a suitable indicia may be placed as shown in the drawings. A spring biasing means 18 is shown disposed between the head 17 and the guide 16 to urge the movable illuminating member 12 to one extreme or inactive position. A suitable stop member 19 may be positioned along the stem of movable member 12 to halt the outward movement of member 12 due to the force of spring 18, or a stop member could be positioned elsewhere to the same effect. A second stopping means, which, for example, may be an enlarged diameter 20 of member 12 near its head 17, limits movement of member 12 in the opposite direction so as to properly align areas 13 with members 15 upon the depression of a given movable member to its active controlled position.

Although only three movable illuminating members 12 are shown in the embodiment in FIG. 1, other such members could be disposed as indicated by apertures 14 shown on the top surface of light conducting member 15. In the intended use of this device as a communication means for use with a digital computer, as many movable members as there are characters to be communicated could be required. Similarly, although only four of the light conducting members 15 are shown, additional light conducting members could be provided as necessary to make up an n-bit coded array, there being one light conducting member for each bit desired in the chosen coding format and one additional light conducting member for a purpose to be discussed later.

Movable illuminating member 12 and light conducting member 15 are made of any suitable light conducting material, such as glass or clear plastic. Photosensitive elements 21 are shown positioned adjacent a surface of each of light conducting members 15 and are to be understood as being connected to suitable electronic circuit devices which utilize the output signal generated by said photosensitive devices 21 whenever light is present in a conducting member 15. As these photosensitive devices 21 may be either photoconductive or photoresistive, leads 22 are not shown connected to any particular form of circuitry, but are to be understood as connected to appropriate circuit devices to utilize the type of signal produced according to the type of photosensitive element 21 used. Spacer members 23 are shown interposed between the various light conductive elements 15, but any suitable spacing arrangement or method could be used. For instance, an opaque block of material could be interposed over the entire surface between each pair of light conductive members 15 to provide a sturdy and rugged construction and to maintain accurate spacing between light conductive members. Such a block of material can also serve the function of optically isolating individual members 15, in which case barrier layer 24 can be omitted.

Since light may be showing in one or more of said light conductive members 15 at any given time, and since there may be some outward leakage of light from these members, opaque barrier layers 24, best seen in FIG. 5 are provided. These barrier layers may be of any suitable material including paint. They prevent the erroneous generation of a signal in an adjacent non-illuminated light conducting member due to light leaking from an illuminated light conducting member.

Turning now to FIG. 2, a more detailed view of a movable illuminating member 12 is shown. As shown in FIG. 2, much of the length of the stem of movable member 12 has an opaque exterior surface 25. However, certain non-opaque areas 13 are disposed along the stem of members 12 in a coded array or spacing pattern. The spacing pattern of the non-opaque areas is chosen depending upon the form of the particular code to be used. It is to be understood, as pointed out previously, that movable illuminating member 12 is made of a light conductive material, but due to internal strains, surface imperfections, and trace impurities, some of the light is diffused radially outward from said movable illuminating member 12 along its entire length. This being the case, it is necessary to cover those areas of member 12 in which it is not desired to allow emission of light. This may be accomplished by any suitable means, such as by paint, metallic bands, opaque plastic collars, and the like, as indicated at 25.

If desired, some of the light flowing through the length of movable illuminating member 12 may be allowed to impinge on the underside of head 17, thereby illuminating a character or suitable indicia on said head 17, it being understood, head 17 is made of material which admits the passage of light in this instance.

FIG. 4 shows a more detailed view of the structure indicated in FIG. 1, it being understood that in the embodiment shown, light from the primary source 10 and diffuser 11 impinges upon the bottom end of movable illuminating member 12 at all times. As indicated in FIG. 4, movable illuminating members 12 are capable of assuming two positions, with an activated or active position and an unactivated or inactive position as shown. Spacer elements 23 may be of equal thickness, the spacing of non-opaque areas being chosen along the stem of movable illuminating member 12 so that one non-opaque area, such as 13*a*, is the last one to pass light into a light conductive member upon the actuation of member 12. Of course, the thicknesses of the light conductive members 15 must be great enough so that the first non-opaque areas which pass light into their respective light conductive members will still be aligned therewith at the time the differently-spaced non-opaque area illuminates its light conductive member. Alternatively, spacer elements 23 can be of two different thicknesses wherein all of the light conductive members 15 are spaced apart by at least a given amount, but the last light conductive member in the stack, in this case, shown as the bottom member 15, but could also be top member 15 instead, or any other member, is spaced apart by a slightly greater distance. The corresponding, non-opaque area 13*a* is shown in movable illuminating member 12, positioned at a slightly greater distance above the top surface of its associated light conductive member 15 than are other non-opaque areas 13 above their respective light conductive members 15. This difference in spacing of the light conductive members 15 and the final non-opaque areas 13a or in the spacing of the non-opaque areas 13 alone, as described above, provides a self-synchronizing function since non-opaque area 13*a* will not enter and admit light into light conductive member 15 until all the other non-opaque areas 13 have entered into the apertures in their respective light conductive members 15 and are emitting light therein at a first location. This insures that a signal will be present on each of leads 22 from photosensors 21 which are to be energized by a given movable illuminating member 12; that is, a given code pattern, before the non-opaque area 13*a* enters its corresponding light conductive member 15. The photosensor 21 shown attached to bottommost light conductive member 15 is used to generate a synchronizing signal to initiate the sampling of signals on leads 22 on remaining photosensors 21. In the embodiment shown in FIG. 4, for a given coding format, it is clear that there will be $n+1$ light conductive members 15, there being an additional light conductive member over the $n$ required to make up a chosen code format for the purpose just outlined of providing a self-synchronizing function for each movable illuminating member 12.

As previously stated, both light conductive members 15 and movable illuminating members 12 are made of a light conductive material, such as glass or clear plastic. While the light would ordinarily be channeled along the stem of movable illuminating member 12, some light does escape radially outward from the stem. It is believed that this is due to internal strains, imperfections, and impurities, but enough light is diverted along the entire length of the stem to illuminate its outer surface. The effect may be increased, if desired, by etching or roughening the outer surface in areas where increased light emission is desired. If desired, the exterior surfaces or edges of light conductive members 15 may be coated with a reflecting material to trap the light emitted into said conductive members thereby increasing the intensity at the responsive surface of photosensor 21.

Another embodiment of this invention could be constructed using a modified illuminating member. FIG. 3 shows a modification of movable illuminating member 12 in which a longitudinal bore or aperture 6 is made in the stem of movable illuminating member 12 to allow more light from the primary source to flow up into the stem, thereby increasing the amount of light being emitted at non-opaque areas 13. FIG. 6 shows still another modification in which the light emitting areas 13 are electroluminescent bands, which are continuously supplied with electric current through suitable conductors and contacts.

I have explained my invention in detail, and it is to be understood that the invention is not limited in its application to the details of construction and arrangement of parts illustrated in the accompanying drawings, since the invention is capable of other embodiments and of being practiced or carried out in various ways. For example, while the device is primarily intended for use in communications with a digital computer, the communications might be recorded as produced by the encoder for later use by other types of data processing equipment.

Also, it is to be understood that the phraseology or terminology employed herein is for the purpose of description and not of limitation.

DESCRIPTION OF OPERATION

Assume that one illuminating member 12 is depressed as shown in FIGS. 1 and 4. As shown in FIGS. 1 and 2, light enters the end of movable illuminating member 12. In this manner, whenever a given member 12 is depressed, non-opaque areas 13 become aligned with their respective light conductive members 15 via the apertures 14 therein. This light is conducted by selected conductive members 15 so illuminated to the sensitive surfaces of photosensitive devices 21, regardless of the location of the apertures 14 within conductive elements 15 at which the light enters said elements, due to the phenomenon of total internal reflection.

Assuming now that the presence of light in a given conductive member 15 is taken as a logic "1," the particular embodiment shown in FIG. 1 has a coded movable illuminating member 12 which is depressed and which is encoded with the pattern 0111 reading from head 17 downward. The bottommost non-opaque area 13*a*, as previously noted, is utilized to generate a self-synchronizing signal for the sampling of the output on leads 22 associated with photosensitive devices 21.

It can be seen that the number of code elements is dependent only on the physical size of the members utilized and that any given format of code requiring *n* bits of data can be constructed by expanding or contracting the number of members used. This is of particular advantage in communicating with digital computers which may utilize differing code schemes.

ADVANTAGES

There are numerous advantages to the construction and use of my invention which will be obvious to any one of skill in this art, but among them the following, not by way of limitation, are noteworthy:

An advantage of this invention is that it provides an optical code generating apparatus in which the mechanical tolerances between various elements are not critical, thereby eliminating the difficulty and expense in constructing the apparatus.

A further advantage of this invention is that it provides an optical code generating apparatus in which the individual codes may be independently selected without affecting the other code members.

An advantage of this invention is that it provides a self-synchronizing apparatus in which each code selecting member synchronizes the sampling of the outputs by a signal produced by its own unique construction without the necessity of an independent switch or other external synchronizing element.

Still another advantage of this invention is that it brings the source of light closer to the photosensitive elements than is possible by the use of multiple shutter elements and external light sources, thereby improving the reliability and accuracy of signal generation.

A further advantage of this invention is that it provides a rugged, compact structure which is not vulnerable to shock, vibration and erroneous signal generation as a result thereof.

Still another advantage of this invention is that it provides optical code generating apparatus which is capable of reliable high speed operation.

While this invention has been particularly shown and described with reference to the preferred embodiment thereof, it will be understood by those skilled in the art that various changes in form and details may be made therein without departing from the spirit and scope of this invention.

What is claimed is:

1. Optical code generating apparatus, comprising:

a plurality of optically separate light conductive means for conducting light;

each of said light conductive means having at least one input location at which light may enter and at least one output location at which light may exit therefrom;

at least one movable light source input member carrying a coded array of light emitting source areas and mounted for movement into an active position in which said coded array of light emitting source areas illuminates the input locations of selected ones of said light conductive means; and at least one light responsive electric signal producing means for each said light conductive means and positioned to receive light from each said light conductive means at said output location thereon for producing an electric signal indicative of the illuminated condition thereof in response to illumination thereof by a said light emitting source area carried by said movable member.

2. Optical code generating apparatus, comprising:

a plurality of light conductive means for conducting light, said light conductive means each having at least one first location at which light may enter said light conductive means and at least one second location at which light may exit therefrom;

spacing means for maintaining said light conductive means in a spaced relationship to one another;

at least one movable member mounted for translation between active and inactive controlled positions and intersecting a portion of a plane of each of said plural light conductive means at a said first location thereon;

said movable member having a plurality of illuminating source areas for emitting light into selected ones of said plural light conductive means at said first location thereon, said source areas being located in a spaced relationship to one another, said spaced relationship of said illuminating source areas matching said spaced relationship of selected ones of said plural light conductive means to produce alignment between said illuminating source areas and a selected array of said light conductive means whenever said movable member is translated from said inactive controlled position to said active controlled position; and light responsive electrical signal producing means positioned with each of said plural light conductive means at said second location thereon for producing electrical signals indicative of the illuminated condition of each of said light conductive means in response to light from said illuminating source areas when said areas are carried into said first location by said movable member being moved to said active controlled position.

3. A movable member as described in claim 2, wherein:

said member is composed principally of a light conductive material which emits light from its surfaces in addition to conducting the light when ever said member is illuminated by a source of light; and said light emissive surfaces of said member have selected areas thereof made opaque to the transmission of light to form a coded array of separate light emissive source areas on said member.

4. A movable member as described in claim 2, wherein:

said movable member is composed of material capable of carrying light emissive illuminating sources; and said light emissive sources are electroluminent devices disposed in a coded array and provided with a source of electric current and carried by said member.

5. Optical code generating apparatus as described in claim 2, wherein:

said spacing means comprises a layer of opaque material interposed between successive ones of said light conductive means; and said light conductive means comprises layers of light conductive material.

6. Optical code generating apparatus as described in claim 2, wherein:

said movable member is composed principally of a light conductive material which emits light from its surfaces in addition to conducting the light, whenever said member is illuminated by said source of light; and said light emissive surfaces of said member have selected areas thereof made opaque to the transmission of light to form a coded array of separate light emissive areas on said member.

7. Optical code generating apparatus as described in claim 2, wherein:

said movable member is composed of material capable of carrying light emissive illuminating sources; and said light emissive illuminating sources are electroluminent devices disposed in a coded array and provided with a source of electric current and carried by said movable member.

8. Optical code generating apparatus, comprising:

$n+1$ sheets of light conductive material where $n$ is the number of elements required in a code format, each of said sheets of light conductive material having at least one aperture at a first location thereon at which light may enter and at least one second location at which light may exit therefrom;

spacing means for maintaining said sheets in a spaced relationship to one another;

at least one movable illuminating member composed of light conductive and emissive material and having selected areas of its surface made opaque to light and being mounted for movement between an active and an inactive controlled position and intersecting a portion of the plane of each of said sheets of light conductive material, said selected areas of the surface of said movable illuminating member which are made opaque to light being chosen to leave a spaced array of light emissive areas on said surface;

a source of light for illuminating a portion of said movable illuminating member;

said spaced relationship of said light emissive areas matching said spaced relationship of selected ones of said sheets of light conductive material so that each of said light emissive areas will be brought into co-planar alignment with a portion of a plane of an individual sheet of said sheets of light conductive material when said movable illuminating member is moved from said inactive controlled position to said active controlled position; and a light responsive electric signal generator positioned at said second location on each of said sheets of light conductive material for producing electrical signals indicative of the illuminated condition of said sheets of conductive material produced by light from said emissive areas of said movable illuminating member when said emissive areas are carried into said apertures at said first locations on said sheets of light conductive material by said movable illuminating member being moved to said active controlled position.

9. Optical code generating apparatus as described in claim 8, wherein:

each of said sheets of light conductive material is optically isolated from each adjacent such sheet by an opaque barrier layer of material; and said opaque barrier layer serves as said spacing means between said sheets.

10. Optical code generating apparatus as described in claim 8, wherein:

said movable member is composed of material capable of carrying light emissive illuminating sources; and said light emissive illuminating sources are electroluminent devices disposed in a coded array and provided with a source of electric current and carried by said movable member.

* * * * *